# United States Patent Office 3,511,462
Patented May 12, 1970

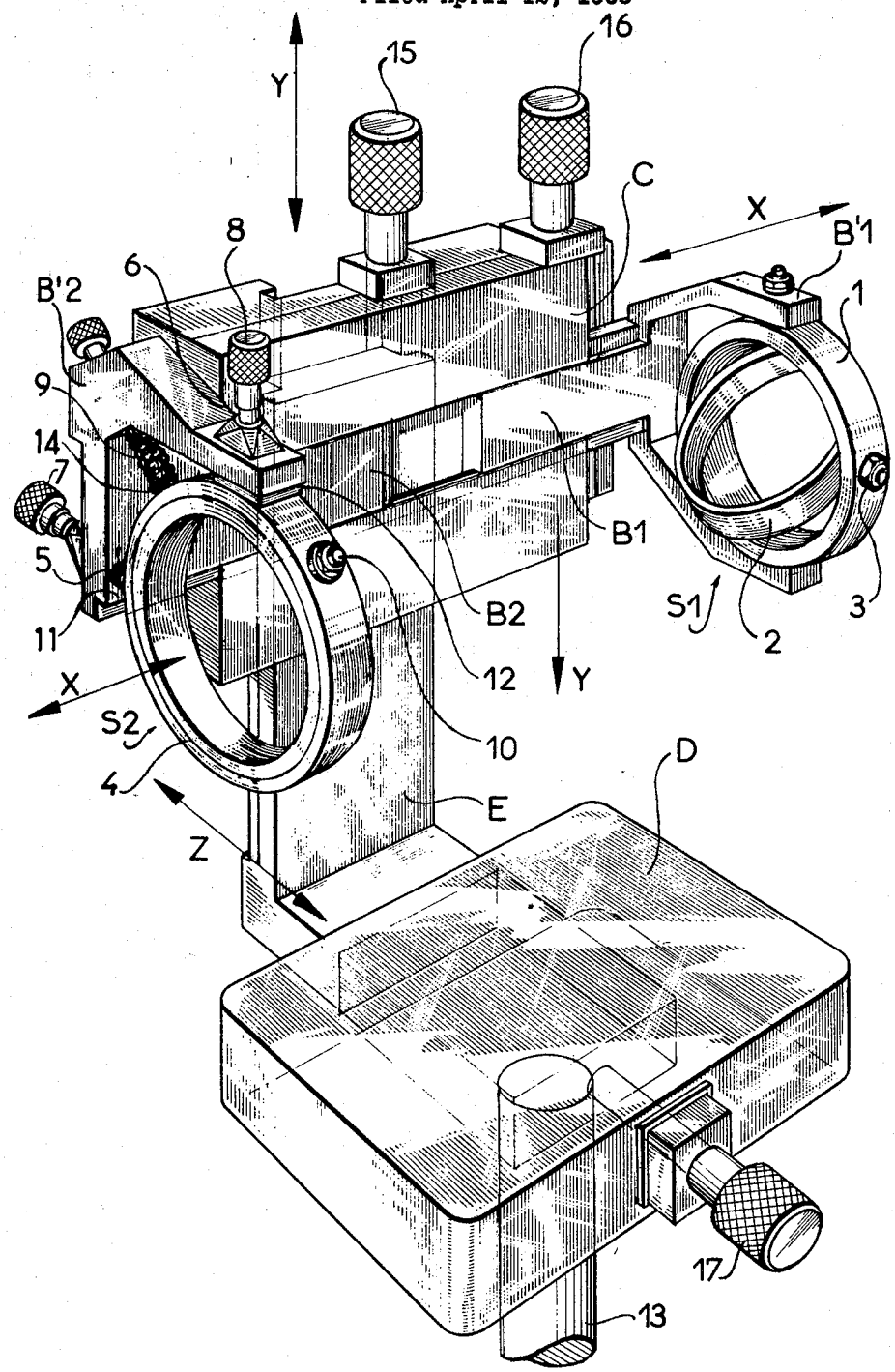

3,511,462
DEVICE FOR THE SUPPORTING AND CENTERING OF COMPONENTS
Jean-Claude Dousseau de Bazignan, Paris, France, assignor to Compagnie Generale d'Electricite, Paris, France, a French corporation
Filed Apr. 12, 1968, Ser. No. 721,020
Claims priority, application France, Apr. 13, 1967, 102,663
Int. Cl. F16m 11/12; G02h 7/00
U.S. Cl. 248—179                                10 Claims

ABSTRACT OF THE DISCLOSURE

A laser optical component supporting and centering device for independently moving an axially adjustable second support relative to a universally mounted first supported by applying two non-parallel translation forces at two spaced points of the second support.

---

The present invention relates to a device for the supporting and centering of components, more particularly of optical systems such as telescopes or light sources, more particularly lasers.

On an optical bench it is necessary, in order to obtain precise manipulations, to make the optical axes of components such as lenses, mirrors or light sources coincide. There are many systems in existence for arriving at such results. They involve a very complicated technique and are consequently cumbersome, in cases where it is necessary to obtain rotational movements, or have a very simple technique and in some cases the precision obtained and the fineness of the settings are not in accordance with the needs of modern optics.

This is why the present invention has as its object to overcome these disadvantages.

The device for supporting and centering an optical component according to the invention is characterised more particularly in that it comprises two supports arranged opposite one another at a regulatable distance, a first support being adapted to move in accordance with a universal joint system and the second being adapted to be displaced, independently of the said first support by the action of two translational forces each concentrated at a point which are applied at two points of the second support in two non-parallel directions.

According to another feature of the invention, the aforesaid second support is applied against means transmitting the translational forces through the agency of an elastic means placed approximately on the bisector of the acute angle formed by the two directions of the translational forces.

According to another feature, the supporting and fixing device according to the invention comprises a fixed frame comprising two arms on which are fixed the two supports adapted to slide in the said frame to permit regulating the distance between the two supports.

According to another feature of the invention the aforesaid fixed frame comprises translational and rotational movement means.

Such a device has many advantages, more particularly ease in construction, and is consequently not cumbersome, is extremely precise, and can be used for apparatus of any volume and any weight.

Other features and advantages of the invention will be brought out from the description given with reference to the accompanying drawing, the single figure of which shows a perspective view of the device. The drawing shows one of the forms of embodiment of the invention. This device is constituted by two supports $S_1$ and $S_2$ carried by two arms $B_1$ and $B_2$ adapted to slide in a frame C and situated opposite one another at a regulatable distance, the said distance being adapted to be adjusted in accordance with the length of the optical component (not shown) which is to be arranged between the supports $S_1$ and $S_2$. A first support $S_1$ placed between two forks $B'_1$ at one end of the part $B_1$ or arm carried by the frame is constituted in the example of embodiment given here by two concentric rings 1, 2 arranged in the manner of a universal joint. The optical component will be locked by an element 3 such as a screw in the central ring 2. The second support $S_2$ fixed on a fork $B'_2$ at one end of the part $B_2$ or arm comprised by the frame is constituted by a floating ring 4 co-operating with two shanks 5 and 6 being adapted to be displaced in translational movement in two non-parallel directions, the two directions being perpendicular in the case of the drawing. The ring 4 is applied to the ends of the shanks 5 and 6 by an elastic means, for example a spring 9 connected to the arm 2 which the frame comprises and to a point 14 on the ring 4, the said spring 9 being arranged approximately on the bisector of the directions of the said concentrated translational forces applied to the support $S_2$, by the shanks 5 and 6.

The optical component will be arranged in the ring 4 of the support $S_2$ situated at a specific distance from the support $S_1$, and locked in the ring 4 by an element 10 such as a screw, the spring 9 being then attached to the point 14. Under the action of the tension of the spring 9, the ring 4 is applied against the ends of the shanks 5 and 6 of the micrometer screws 7 and 8. At the setting of the alignment of the optical component, the ends of the shanks 5 and 6 co-operate with the face of the ring either by friction means, the face of the ring 4 being provided for this purpose with friction shoes or flats 11, 12, or by ball bearing means, to permit easy fitting of the said ring on the ends of the shanks.

The frame C comprising the arms $B_1$, $B_2$ can slide on a support E situated on a base D. The frame C comprises a first screw 15 permitting vertical displacement Y of the arms $B_1$, $B_2$, and a second screw 16 permitting horizontal displacement X of the arms $B_1$, $B_2$. The base D comprises a third screw 17 permitting horizontal displacement Z, perpendicularly to the plane of the directions X and Y, of the arms $B_1$, $B_2$, the said base D being also capable of pivoting about a pivot pin 13 in order to permit orientating in any direction the optical component which is to be arranged between the two supports.

An arrangement of this kind affords many advantages, and more particularly when using the device the universal-joint support $S_1$ makes it possible to obtain a first adjustment with a fixed reference point which is the centre of the support ring 1, the support $S_2$ then making it possible to carry out an angular adjustment relatively to this fixed reference point, and it is important to point out that the greater the distance between these two supports the better the precision of centering of the said optical component will be. For a relatively considerable distance ... the two supports, the micrometer screws 7 and 8 can be replaced by any desired screws. It is also possible in the case of considerable loads and in order to reduce the reactions on the micrometer screw shanks, to position the spring 9 in such a manner as to have only a minimum reaction force on the micrometer screw shanks, thus limiting the wear thereon.

What is claimed is:
1. A device for supporting and centering optical components, comprising a first universal-joint support and a second support, means for arranging said supports opposite one another at a regulatable distance on a frame, and means for transmitting two translational forces, in two non-parallel directions, each concentrated at a point on said second support thereby rendering said second support capable of moving independently of said first universal-joint support.

2. A device according to claim 1, further including elastic means arranged substantially on the bisector of the directions of the two concentrated translational forces, the two ends of which are fixed respectively to the frame and to said second support.

3. A device according to claim 2, wherein the second support comprises a floating ring fixed to the said frame by said elastic means.

4. A device according to claim 1, wherein the means for transmitting said concentrated translational forces comprise shanks carried by respective adjusting screws.

5. A device according to claim 1, wherein the transmission means for said concentrated translational forces which cooperates with the face of the said second support comprises a friction means.

6. A device according to claim 1, wherein the transmission means for said concentrated translational forces which cooperates with the face of said second support comprises ball bearing means.

7. A device according to claim 1, further including two arms adapted to slide in the frame and coupled respectively to said first and second supports.

8. A device according to claim 1, further including means for simultaneously translationally moving said two supports.

9. A device according to claim 8, further including means for simultaneously rotating said two supports.

10. A device according to claim 1, further including means for simultaneously rotating the two supports.

References Cited

UNITED STATES PATENTS

| 2,424,011 | 7/1947 | De Gramont | 248—178 |
| 2,493,770 | 1/1950 | Manning | 350—85 |
| 3,226,536 | 12/1965 | Atkin et al. | 248—180 |
| 3,265,855 | 8/1966 | Norton | 350—81 |
| 3,433,569 | 3/1969 | Francis | 350—85 |

FOREIGN PATENTS 490,148  1/1930  Germany.

MARION PARSONS, JR., Primary Examiner

U.S. Cl. X.R.

350—81, 85